F. R. SOSA.
HARROW.
APPLICATION FILED SEPT. 9, 1907.
898,695.
Patented Sept. 15, 1908.
3 SHEETS—SHEET 2.
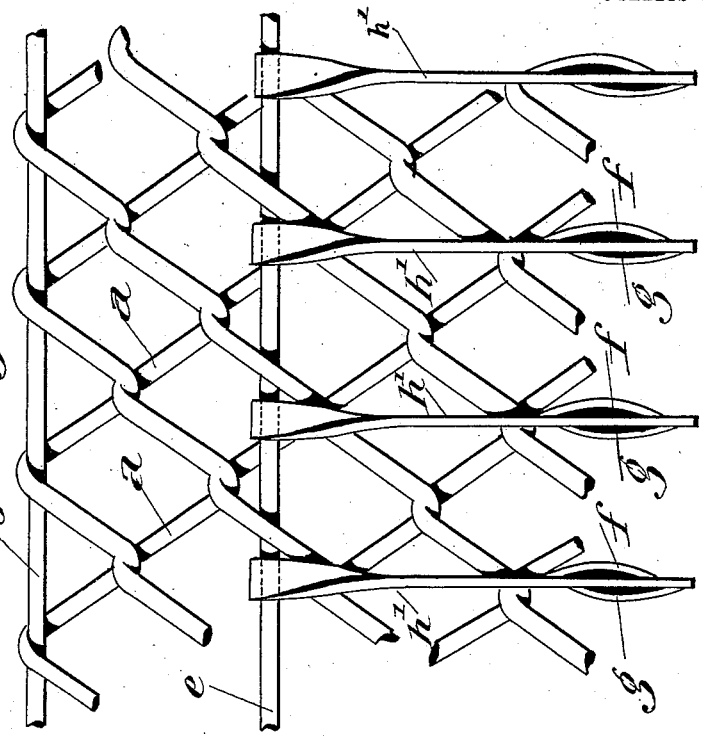
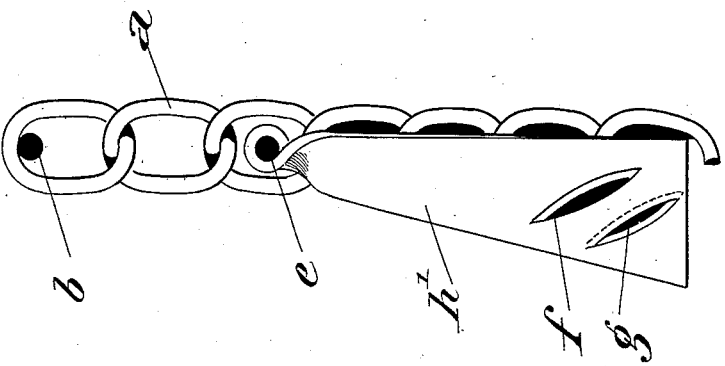
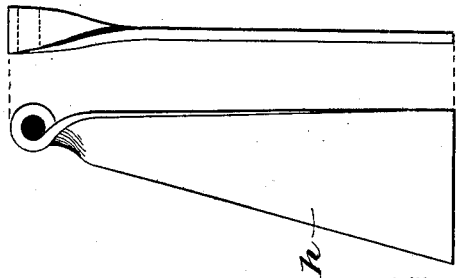
WITNESSES:
INVENTOR,
FRANCISCO REMIGIO SOSA,
BY
Attorneys.

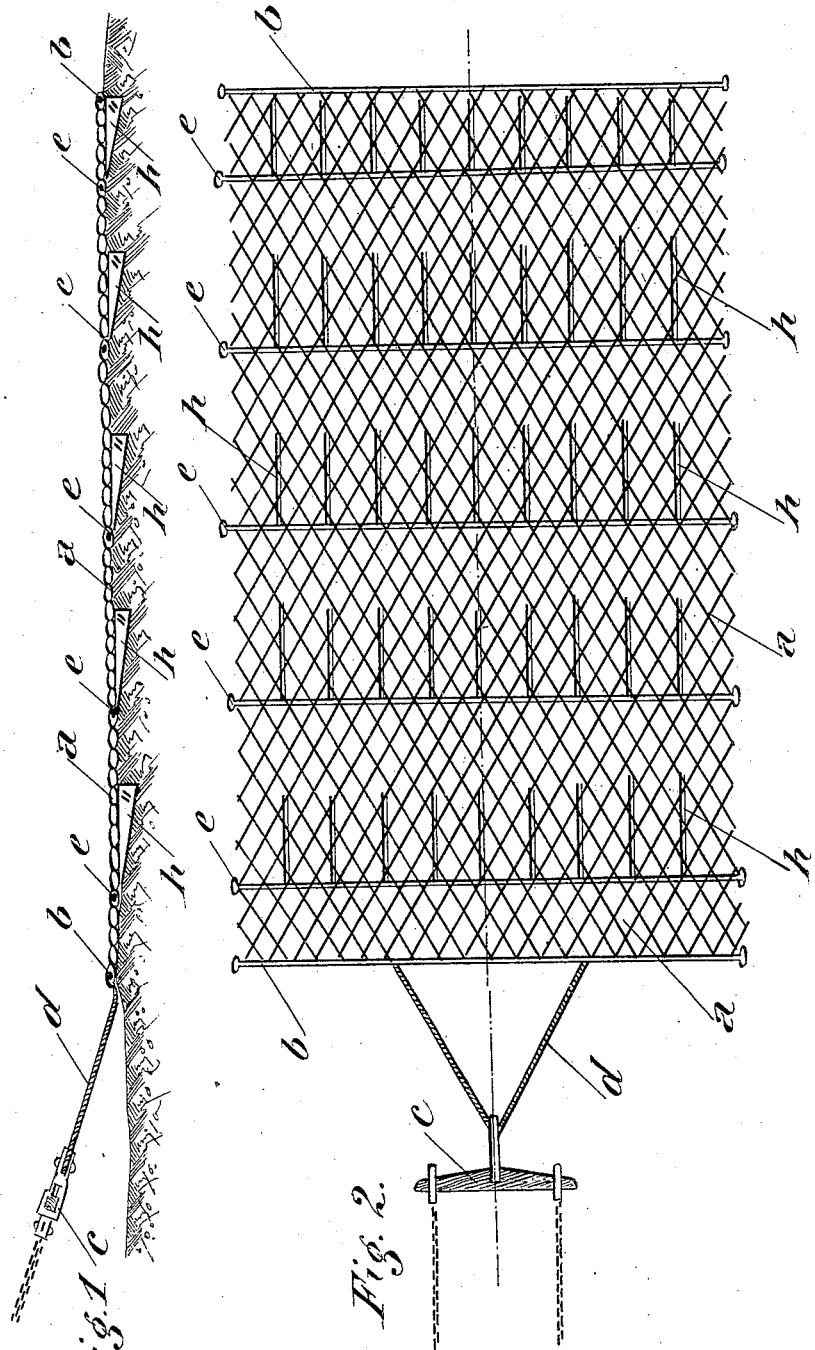

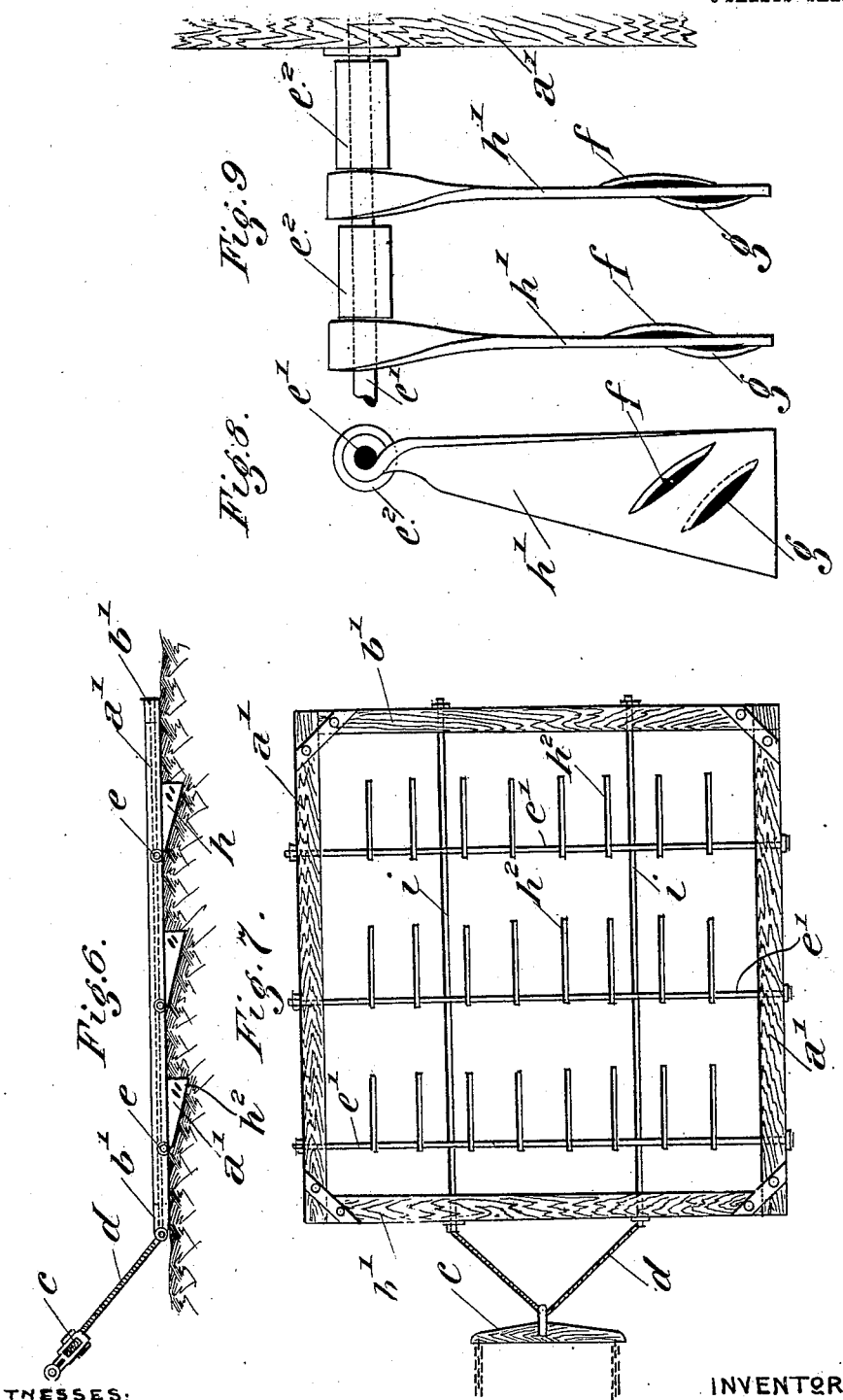

UNITED STATES PATENT OFFICE.

FRANCISCO REMIGIO SOSA, OF BUENOS AYRES, ARGENTINA.

HARROW.

No. 898,695.

Specification of Letters Patent.

Patented Sept. 15, 1908.

Application filed September 9, 1907. Serial No. 391,867.

*To all whom it may concern:*

Be it known that I, FRANCISCO REMIGIO SOSA, a citizen of Argentina, residing at 25 de Mayo street No. 42, Buenos Ayres, Argentina, have invented a new and useful Improvement in Harrows; and I do hereby declare the following to be a full, clear, and exact description of the same.

The present invention relates to an improved harrow designed for agricultural purposes and which owing to its peculiar construction, may be conveniently used for destroying locusts during any of the periods of growth of these insects, while said implement will also yield very favorable results in the destruction of weeds on the fields.

I shall now proceed to describe my invention by making reference to the accompanying drawings, in which similar letters of reference indicate like parts in all the different views.

Figure 1 is a side view of the harrow, placed on a soft and even soil, in position ready for working. Fig. 2 is an upper plan view of the implement, also in working position. Fig. 3 is a partial inverted view of the harrow, showing the manner of mounting the knives or blades $h'$. Fig. 4 is a side view of the blades $h'$. Fig. 5 shows a side view of one of the blades $h$; this blade is similar to the blade $h'$, of Fig. 4, the slots and wings $f$, $g$, having been suppressed. Fig. 6 is a side view of the harrow in which the grate or wire netting has been substituted by a frame of wood or iron. Fig. 7 is an upper plan view of the harrow shown in Fig. 6, in working position. Fig. 8 is a side view of the blade $h'$ shown in Fig. 9. Fig. 9 is a partial view of the harrow of Figs. 6 and 7 which illustrates the way of supporting the blades in the framing $a$ of wood or iron.

In Figs. 1, 2 and 3 of said drawings, $a$ indicates the grate or wire netting, of iron, of the kind generally used for fences, but I prefer to make use of wire of two lines in diameter and the meshing measuring two inches. $b$ are bars, of any convenient cross-section, which form the fore and rear end of the harrow. $c$ is the swing splinter bar for the horse or horses which are to draw the harrow, and $d$ are the chains which connect said bar to the body of the harrow.

The body of the harrow consists (Figs. 1–5) of wire netting, of the kind usually employed for fencing or manufactured expressly for the present purpose; the dimensions best adapted for the draft of one horse, are two meters in width by three meters in length; these dimensions may vary of course, in accordance with the work to be done and the number of draft animals employed. To this netting, the wires $e$ are secured at intervals, by passing them alternately (as shown in Fig. 3) above and below through the meshes of the netting; said wires $e$ support the knives or blades and have to this end been threaded through the eyelets of these latter. The number of blades placed in a row may vary. A blade may be fixed as desired, for instance in every mesh of the netting, as shown in Fig. 3. The blades or knives thus placed in rows (Figs. 2 and 7), form a kind of comb below the netting or grate, and as many rows of such combs may be used as may be desired, in accordance with the soil and the fineness of the work to be done, or as may be necessary for the thorough destruction of the locusts or of the weeds.

$e$ are wires or bars which cross the meshes of the grate or netting of the harrow from one side to the other; on these wires $e$ the knives or blades $h'$ or $h$ (Figs. 4 and 5) are mounted, and the ends of the wires $e$ are fixed in any convenient manner to the sides of the harrow.

$h$, $h'$ are the knives or blades, supported on the wires $e$, and of which any convenient number may be provided. As shown in the drawings, said blades are so connected to said wires $e$ that they always lie below the harrow, or below that side of the netting which is next to the ground. The blades are made of sheet iron or sheet steel, of triangular shape and preferably of one line in thickness. The upper end of the blade is twisted and bent back over itself, so as to form an eyelet through which the wire $e$ is passed which is to support the blades.

$f$ and $g$ are cuts or slots provided in blades $h'$ (Fig. 4) so as to form lateral projections or wings, as seen in Figs. 3 and 9, which assist in stirring the soil and covering the seeds.

Figs. 6 and 7 show a frame of wood or iron, having side bars $a'$ and front and rear bars $b'$ and $b'$, which may be used in connection with a modified form of the harrow, instead of the grate or wire netting. $e'$ indicates iron bars secured to the side bars of the frame and which support the blades. $e^2$ are sleeves (Fig. 9) placed on the bars $e$, for separating the blades, and $i$ (Fig. 7) are iron bars or wires fixed to the front and rear bars of the frame, and which keep the bars e' in their position.

As has already been stated above, instead of the wire netting a, a simple frame of wood or iron, such as shown at a', a', b', b' in Figs. 6 and 7 may be used, and this frame may be of a rounded or of any other convenient shape, since as such frame only serves to carry the bars which support the blades, the shape of the frame adopted has no influence whatever on the working of the apparatus.

Having now described my said invention, I declare that what I claim and desire to secure by Letters Patent is:

An agricultural harrow having a body consisting of wire netting, rods fitted in the meshes of said netting and extending crosswise of said body, and a series of blades carried by said rods, in combination with a splinter swing bar secured to the harrow in order to draw the same, substantially as described and set forth.

In testimony whereof, I have signed my name to this specification in the presence of two subscribing witnesses.

FRANCISCO REMIGIO SOSA.

Witnesses:
   J. A. MARVAL,
   OTTO NOLLEND.